Patented Mar. 27, 1934

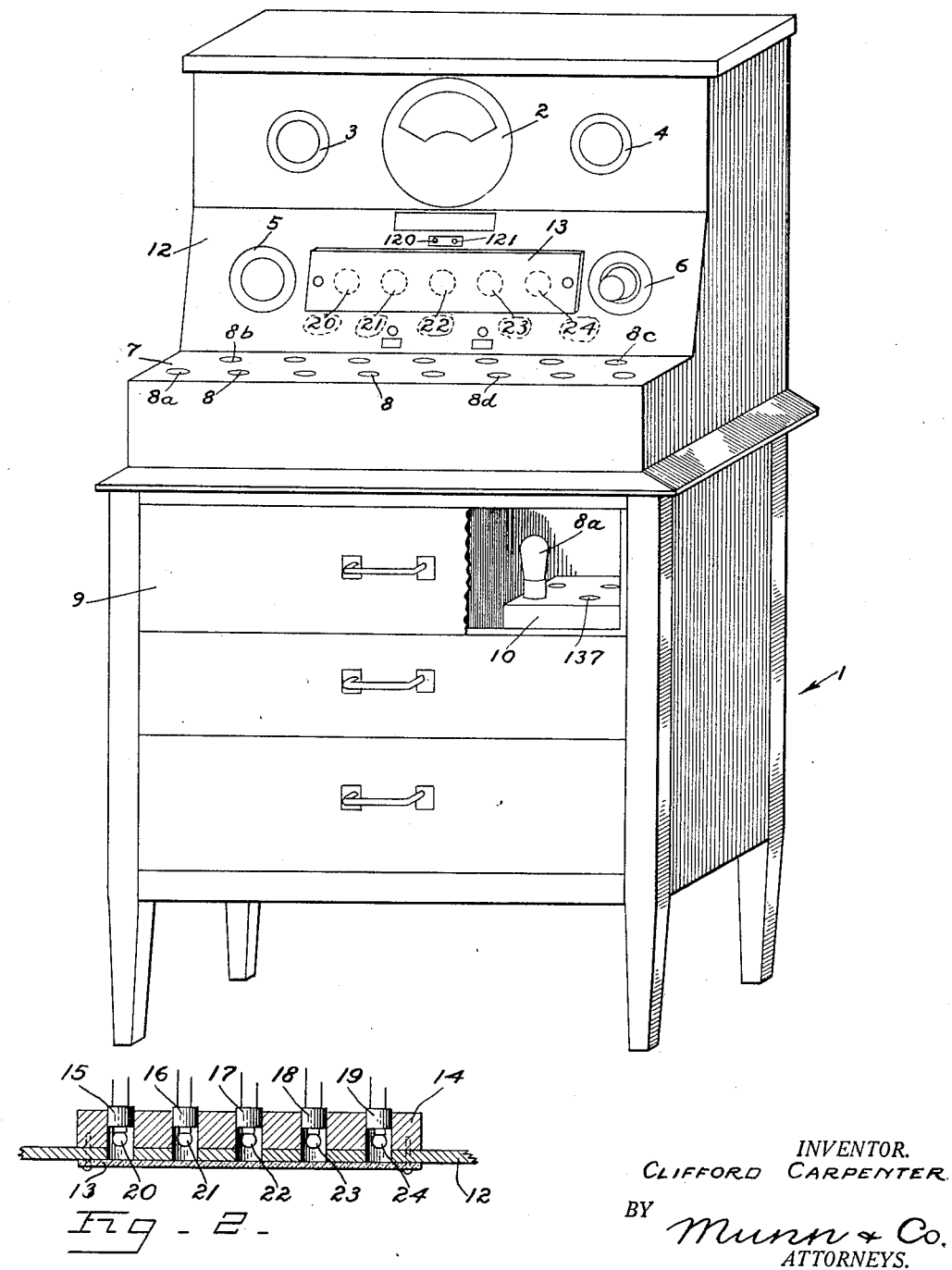

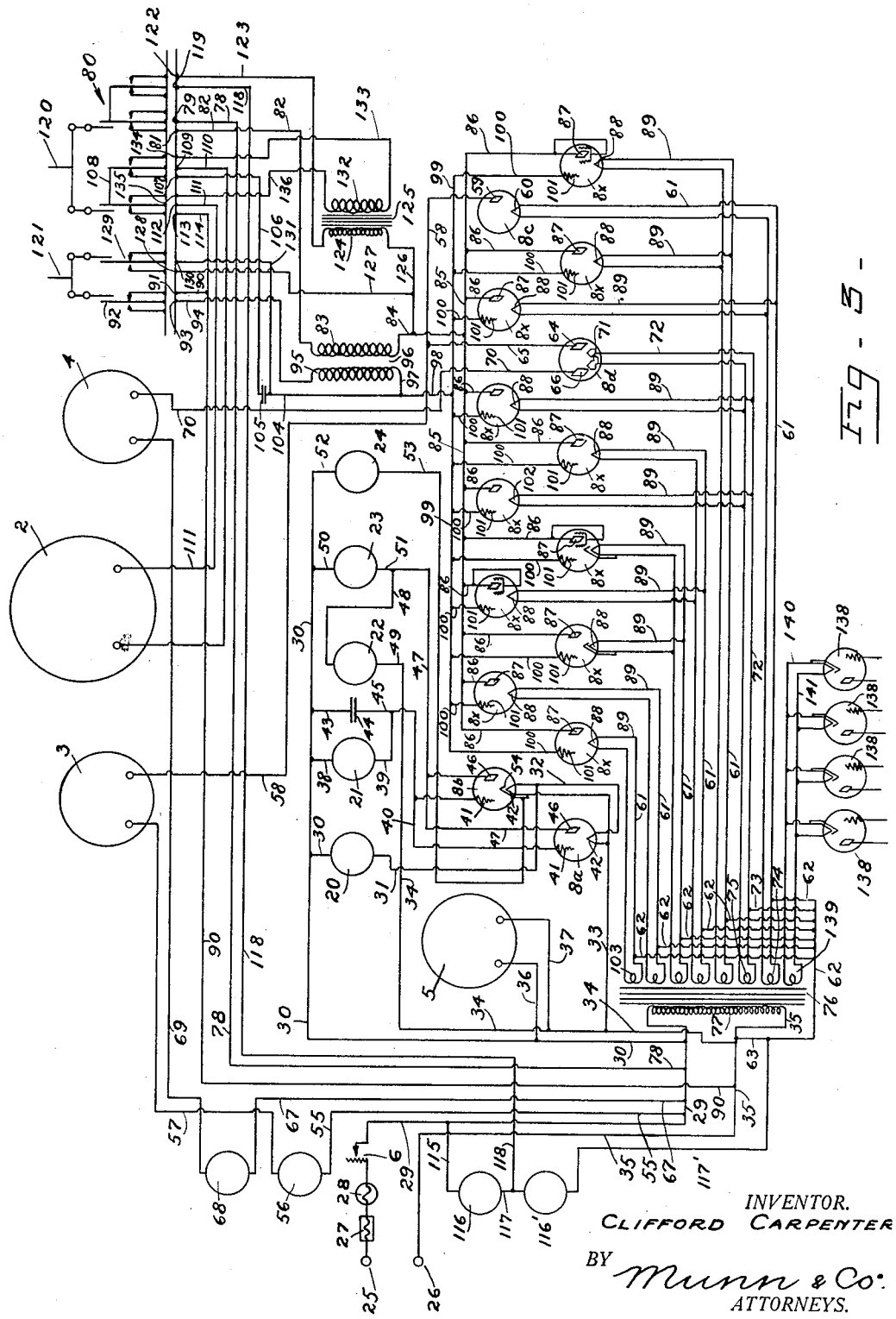

1,952,533

UNITED STATES PATENT OFFICE 1,952,533

RADIO TUBE TESTER

Clifford Carpenter, Snohomish, Wash., assignor to Kinney Bros. & Sipprell, a corporation of Washington Application January 20, 1931, Serial No. 510,007

7 Claims. (Cl. 250—27)

My invention relates to improvements in radio tube testers, and it consists in the combinations, constructions and arrangements hereinafter described and claimed.

An object of my invention is to provide a radio tube tester which has novel means for first testing the tubes for any short circuits, and which also has novel means for testing diode tubes having one or two plates, and also for testing three element tubes, these latter tubes being given an oscillating circuit test and also a space charge test. The device makes use of novel circuits controlled by switches whereby a single milliammeter can be used in checking the oscillating circuit test and also in checking the space charge circuit test.

In checking the tubes for short circuits, I provide a novel means for flashing in words what is wrong with the tube, and the circuits are so arranged as to automatically be closed by the tube itself if the tube is short circuited in any way. I term this the continuity test. In testing diode tubes having two plates, two milliammeters are used, one being in electrical connection with each plate. In this way a double reading is made at one time, while the tube is functioning under the same conditions it would when actually working in the set. The tester is provided with a plurality of sockets for receiving all types of triode and iode tubes, and these tubes are tested under actual working conditions even to the extent of placing the proper amount of current on the filament, this current differing with the particular type of tube.

Other objects and advantages will appear as the specification proceeds, and the novel features of the device will be particularly pointed out in the claims hereto annexed.

My invention is illustrated in the accompanying drawings, in which:

Figure 1 shows a perspective view of the entire device, a portion being broken away, Figure 2 is a section along the line 2—2 of Figure 1, and Figure 3 is a wiring diagram.

In carrying out my invention I provide a cabinet indicated generally at 1 which may be of any size and shape, and on the front face of the cabinet I mount a milliammeter 2, two small milliammeters 3 and 4, a volt meter 5, and a rheostat 6. In a horizontal portion 7 of the cabinet I provide a plurality of sockets indicated generally at 8 for receiving different standard tubes for testing purposes. In the top drawer 9 of the cabinet I provide a heating unit 10 for preheating the tubes hereinafter designated 8a, 8b, 8c and 8d if desired prior to placing the tubes in any one of the sockets 8 designed for receiving the tube in question. I will now describe the

Continuity test

I also mount on the front panel 12 of the cabinet 1 a ground glass 13 having groups of words written thereon which are invisible until lights disposed behind each group of words are illuminated. Reference to Figure 2 shows the front panel 12 supporting the ground glass 13 and a block 14 or other suitable support carrying a group of sockets 15 to 19 inclusive, these sockets carrying lights 20 to 24 inclusive. The current used in checking the tubes for short circuits is extremely small, and I have therefore found that the lights 20 to 24 inclusive should be one-quarter watt Copper Hewitt neon glow lamps. When any one of the tubes tested is shorted, it will close a circuit hereinafter described, which will illuminate the proper lamp, and this lamp in turn will light up the wording on the ground glass 13 which indicates the short circuit.

It is now best to set forth the various circuits used in the continuity test, and reference to Figure 3 will show these circuits. The lamp 20 illuminates "Filament clear" on the glass 13, the lamp 21 illuminates the wording "Grid filament short", while the lamp 22 indicates the wording "Grid plate short". The lamp 23 indicates "Plate filament short", and the lamp 24 indicates "Cathode filament short".

The sockets 8 shown in Figure 1 are indicated by vacuum tubes in Figure 3. In the continuity test, the sockets 8a and 8b are used and are indicated by vacuum tubes in Figure 3. The vacuum tube 8a in Figure 3 has four prongs, while the vacuum tube 8b has five prongs. The test for shorts in either tube is the same except for the "Cathode filament short" test, and therefore a description of one will suffice. The tube tester is designed to be used with an A. C. current of sixty cycles at 110 volts, and this current enters the tester at the terminals 25 and 26. Assume that the tube 8a has no shorts. The current will flow from terminal 25 through fuses 27 and 28, past the rheostat 6 which has been adjusted to 110 volts, through wire 29, wire 30 to neon glow lamp 20, thence to the filament circuit of the tube 8a by means of wire 31 and wire 32 to the filament 42, thence along wire 33 to wire 34, wire 35, and terminal 26. If the filament is clear, the lamp 20 will be illuminated, but if the filament is burned out or broken, the circuit will be broken through the lamp 20. The wiring diagram shows the tube 8b as being tested in the same manner. It should further be noted that the volt meter 5 is shunted across the wires 30 and 34 by wires 36 and 37.

If there is a grid filament short in the tube 8a or the tube 8b, the current will flow from the wire 30 through a wire 38, lamp 21, wire 39, and wire 40 to the grids 41 of the tubes 8a and 8b. From here the current will pass to the filaments 42 of the tubes and back to the wire 33.

The grid plate short will be shown by the lamp 22, and the current in this instance will pass from the wire 30 through the wire 43 and the fixed condenser 44 of a ½ M. F. D. which is sufficiently frequent at sixty cycles to permit current to pass to the wire 45, the wire 40, grids 41, plates 46, wires 47, wire 48, lamp 22, wire 49, and back to wire 34. It should be noted that wattless energy passes through the condenser 44 frequent to an extent at sixty cycles. It should further be observed that in this particular circuit the lamps 21 and 22 are in series with each other across a 110 volt A. C. supply. These lamps do not break down below 80 volts, and therefore do not light, which leaves the glass 13 in a state of darkness until the circuit is closed by the grid plate short. When this circuit is closed, the condenser 44 passes sufficient energy to light the lamp 22. This particular part of the circuit is highly important.

In the plate filament short circuit the current flows from wire 30 through wire 50, lighting lamp 23, then through wire 51 to wires 47. From here the current passes to the plates 46, thence to the filaments 42 and on through the wire 33. The lamp 23 is illuminated in this circuit.

In the cathode filament short the current passes from wire 30 through wire 52, lamp 24, wire 53 to the cathode 54. From here the current passes to the filament 42 and on through the wire 33. A short between the cathode 54 and the filament 42 will close a circuit through the lamp 24.

The tube 8b has the same elements as the tube 8a, but in addition has the cathode 54. If either the tube 8a or the tube 8b is in perfect condition, all of the lamp 21 to 24 inclusive will be de-energized and the lamp 20 will be energized. If any other mechanical trouble is in the tube, the proper lamp will be immediately energized to denote this trouble. The purpose of this particular continuity test is to isolate any mechanical trouble in a radio tube before further testing this tube.

Rectifier circuit

I will now describe how the diode tubes are tested. If the tube has a single plate, it is placed in the socket 8c, and Figure 3 shows the tube instead of the socket. The current enters through the terminal 25 past the fuses 27 and 28, past the rheostat 6, through the wire 29, a wire 55, a lamp resistance 56, wire 57, the milliammeter 3, wire 58, plate 59 of the tube 8c, and filament 60 of the same tube. The return circuit is through wire 61 connected with the filament 60, wire 62, wire 63, and back to wire 35.

When testing a diode tube having two plates as shown in 8d, the current flowing to the plate 64 of this tube flows from a wire 65 connected to the wire 58. The current flows to the other plate 66 of the tube by means of a wire 67 connected to the wire 29, the wire 67 in turn connecting with a resistance lamp 68. The lamp 68 is electrically connected with a wire 69, and this wire leads to the milliammeter 4. A wire 70 connects the milliammeter 4 with the plate 66. The return circuit for both the plates 64 and 66 is by way of the filaments 71 in the tube 8d, then through a wire 72 to a wire 73 that connects with the wire 62. The filaments 60 and 71 obtain their current from the secondaries 74 and 75 of a transformer 76. The primary 77 of the transformer is connected to the terminals 25 and 26 by the wires 29 and 35. The milliammeters 3 and 4 read from zero to eighty, and are for direct current. These instruments test the 280 full wave rectifying tube, and they test the milliampere draw of the diode tube. When either of the tubes 8c or 8d are functioning, a deflection will take place in the milliammeters, and the amount of deflection shows the strength of the tube.

It should be noted that when the tube 8d is tested, both milliammeters 3 and 4 function, and in this way an accurate reading can be given without first testing one plate and then the other, which is usually the case in present tests.

Oscillating circuit test

The plate supply for the oscillating circuit starts at terminal 25, and the current passes through the fuses 27 and 28 and then through the rheostat 6. From here the current passes through wire 29, through a wire 78, and to a terminal 79 of a double pole switch 80. In the oscillating circuit test the switch 80 is in a position where the terminal 79 is closed with a terminal 81, and the current will therefore continue to flow through a wire 82, thence to a winding 83 of a ratio frequency coil 96, then along a wire 84 to a wire 85 known as the plate main. The wire 85 is connected by wires 86 to the plate terminals in all of the sockets 8 with the exception of the sockets receiving the tubes 8a, 8b, 8c and 8d.

The return circuit from the plates 87 connected with the wires 86 is through a filament 88 of the tubes 8x and then along wires 89 to the wires 61 and thence through the wires 62 to the wires 63, 35, and the terminal 26.

The grid supply for the oscillating circuit starts at the terminal 26, goes through the wire 35, wire 90, terminal 91, a single pole switch 92, through terminal 93, wire 94, winding 95 of the radio frequency 96, wire 97, wire 98, and wire 99 which is called the grid main. Wires 100 lead from the grid main 99 to all of the grids 101 of the tubes 8x. It should be understood that only one tube at a time is tested, and this will be any one of the tubes 8x. The various sockets are for receiving all types of tubes.

The filament supply for the tubes 8x in the oscillating circuit is the same as for the filaments in the tubes 8c and 8d. The filaments 102 in the tubes 8x are connected to secondaries 103 of the transformer 76. The milliammeter 2 is used in the oscillating circuit and is connected in what I term a tank circuit. The meter 2 acts as a radio frequency current squared galvanometer, and is connected in the winding 95 of the radio frequency coil 96. This circuit starts at the wire 97, passes through a wire 104, thence through a fixed condenser 105. The current then passes along a wire 106 to a terminal 107 of a double pole switch 108. The current then flows from a terminal 109 of the same switch through a wire 110 to the meter 2, then through a wire 111 to a terminal 112 of the other arm of the double switch 108. From here the current passes to a terminal 113, thence through a wire 114 to the wire 90, then through the switch 92 to the wire 94 and back to the winding 95. This is a radio frequency circuit known as a tank circuit, and is operated by one of the tubes $8x$ and radio frequency coil 96. The galvanometer 2 will read the tank current of the tube under test. The tube draws both its energy as a high frequency generator and its energy for heating the filament from the 110 volt A. C. supply. The switches 80, 108 and 92 are known as transfer switches, and they are in a position shown in the drawings when making the oscillating test.

The galvanometer 2 is calibrated in milliamperes with an arbitrary reading of zero to one hundred. It is actually a zero to one hundred and fifteen milliampere radio frequency current squared hot wire instrument.

The space charge circuit test

In the plate circuit for this test the current starts at the terminal 25 and passes through the fuses 27 and 28 and the rheostat 6. From here the current passes along the wire 29 to a wire 115 through a lamp resistance 116, then through a wire 117, dividing at wire 118, terminal 119 of the double pole switch 80. In the space charge or filament emission test, the switches 80, 92, 129 and 108 are moved into their other positions by handles 120 and 121. The contact 119 will therefore be in electrical connection with the contact 122, and the current at 55 volts will therefore flow along a wire 123 to the primary winding 124 of a line transformer 125. From here the current flows through a wire 126 to the wire 84 and to the plate main 85 which connects with all of the plates 87 of the tubes $8x$ by means of wires 86. The wire 117 connects with a second light 116', and a current at 55 volts passes through this light and back by way of wire 117' to wire 62. It should be kept in mind that only one tube $8x$ is tested at a time. The return circuit from the plates 87 to the terminal 26 has been previously given.

The grid circuit branches off from the plate circuit just described and passes through a wire 127 that is connected to the wire 126, and the wire 127 leads to a terminal 128 of a single pole switch 129. The terminal 128 is connected with a second terminal 130 when the switch 129 is moved into its second position, and the current will therefore flow through a wire 131 to the wire 104 and to the grid main 99 and thence to the grids 101 of the tube $8x$ under test by means of the wires 100. The grid return circuit for the tube $8x$ has already been set forth.

The current flowing through the primary coil 124 in the line transformer 125 induces a current in the secondary coil 132, and this current flows through a wire 133 to a terminal 134 which is connected to the terminal 109 by the double pole switch 103. The current then flows through the wire 110 to the galvanometer 2 and back through the wire 111 to the contact 112. The contact 112 is in electrical connection with a contact 135 by the double pole switch 108. The current will therefore flow through a wire 136 back to the secondary coil 132.

The applying of 55 volts to the plate and grid takes place while these elements are connected in parallel, and this causes the tube $8x$ to act as a diode and to supply intermittent D. C. to the line transformer 125. The galvanometer 2 is connected to the secondary coil 132 during the space charge circuit test, and measures the output of the transformer 125. In this way the filament emission can be accurately checked and indicated on the galvanometer 2.

Tube heating means

In Figure 1 I show the tube heating unit 10 for the tubes $8a$, $8b$, $8c$ and $8d$. If it is desired to warm the filaments of the tubes, they can be placed in sockets 137 shown in Figure 1 and indicated by tubes 138 in Figure 3. The filaments of the tubes 138 are in electrical connection with a secondary 139 of the transformer 76 by wires 140 and 141.

From the foregoing description of the various parts of the device, the operation thereof may be readily understood.

All of the tubes are first tested in the sockets connected with the continuity test before they are subjected to any further test in the machine. Different data will be flashed on the ground glass 13 informing the operator what, if anything, is wrong with the tube under test. If the tube is a diode, it is tested in the manner set forth for testing of the tubes $8c$ and $8d$, and if it is a triode the tube is tested for oscillation and for space charge in the same manner as set forth for the tube $8x$. The operator in changing from the oscillating test to the space charge test merely has to move both switch arms 120 and 121 toward each other, and this disconnects the galvanometer 2 from the tank circuit used in the oscillating test and connects it in with the line transformer 125 used in the space charge test.

The filament circuits have low voltage windings on the transformer 76. The stepdown secondary windings 74, 75, 103 and 139 on this transformer are 1 to 1½, 1 to 2, 1 to 2½, 1 to 3, 1 to 5, and 1 to 7½.

I claim:

1. A tube tester comprising a socket for receiving a three element tube, means for causing the tube to oscillate, and including a grid circuit with a radio frequency, coil winding in series, a tank circuit having the winding in series and including a milliammeter, means for checking the filament emission and including circuits for causing the tube to function as a diode, a primary winding of a line transformer connected in parallel with the plate and grid, and switching means for disconnecting the milliammeter from the radio frequency coil winding and for connecting it to the secondary of the line transformer.

2. A tube tester comprising a radio tube, means for causing the radio tube to oscillate and including a radio frequency coil having a winding in series with the grid and a second winding in series with the plate, a galvanometer, a switch for connecting the galvanometer to the grid winding of the coil, and a space charge test circuit for the tube and including a line transformer, the primary of the transformer being connected in parallel with the grid and plate, said switch being operable for disconnecting the galvanometer from the radio frequency coil and for connecting it to the secondary of the line transformer.

3. A grid plate short test for a radio tube comprising a source of alternating current of a predetermined number of cycles and volts, a radio tube, an electrical indicator connected in series to one side of the current source and to the grid of the tube, a condenser shunted across the indicator, a second electrical indicator connected in series with the plate of the tube and with the other side of the current source, said first and second indicators being connected in series when the grid and plate are shorted and requiring more energy than furnished by the current source for giving a signal, said condenser by-passing wattless energy around the first indicator sufficient to cause the second indicator to signal.

4. A tube tester comprising a radio tube, a lamp in series with a source of alternating current and with the grid of the radio tube, a second lamp in series with the same source of current and with the plate of the tube, said lamps being connected in series when the grid and plate are shorted, but requiring more energy than that delivered by the source of current for lighting the lamps, and a condenser in parallel with the first lamp for by-passing sufficient energy for lighting the second lamp when the grid and plate are shorted.

5. An electric circuit having two indicating devices connected in series, a source of alternating current connected to, but insufficient to actuate both devices at the same time and a by-pass for one of the devices having a condenser therein allowing the second device alone to be actuated when the circuit is closed.

6. A tester for a radio tube comprising a source of alternating current, a radio tube, a grid to filament circuit connecting with the tube and having an indicator therein, a grid to plate circuit connected with the tube and having an indicator in series with the first indicator, the source of current being insufficient to actuate both indicators at the same time, and a condenser shunted across the first indicator for allowing the latter alone to be actuated in case of a grid to filament short and allowing the second indicator alone to be actuated in case of a grid to plate short.

7. An oscillating test and a space charge test for a thermionic valve comprising filament, plate, and grid supply circuits for the valve when testing for oscillations, said grid supply circuit having in series a winding of a radio frequency coil, and a tank circuit having the same winding in series and including a milliammeter; said space charge test comprising plate and grid circuits for connecting the plate and grid in parallel and placing a like voltage on each, said plate circuit including the primary winding of a line transformer, and means for disconnecting the milliammeter from the tank circuit and connecting it in series with the secondary winding of the line transformer for measuring the output of the secondary.

CLIFFORD CARPENTER.